United States Patent Office 3,555,818
Patented Jan. 19, 1971

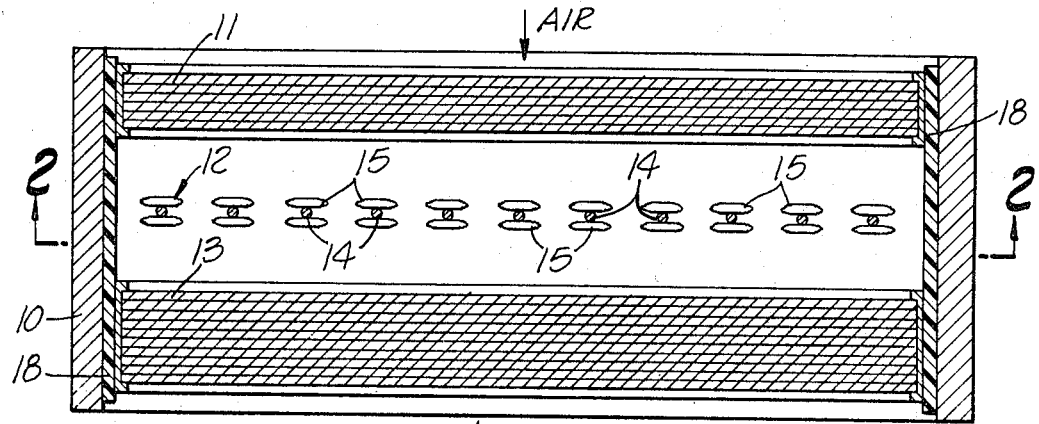
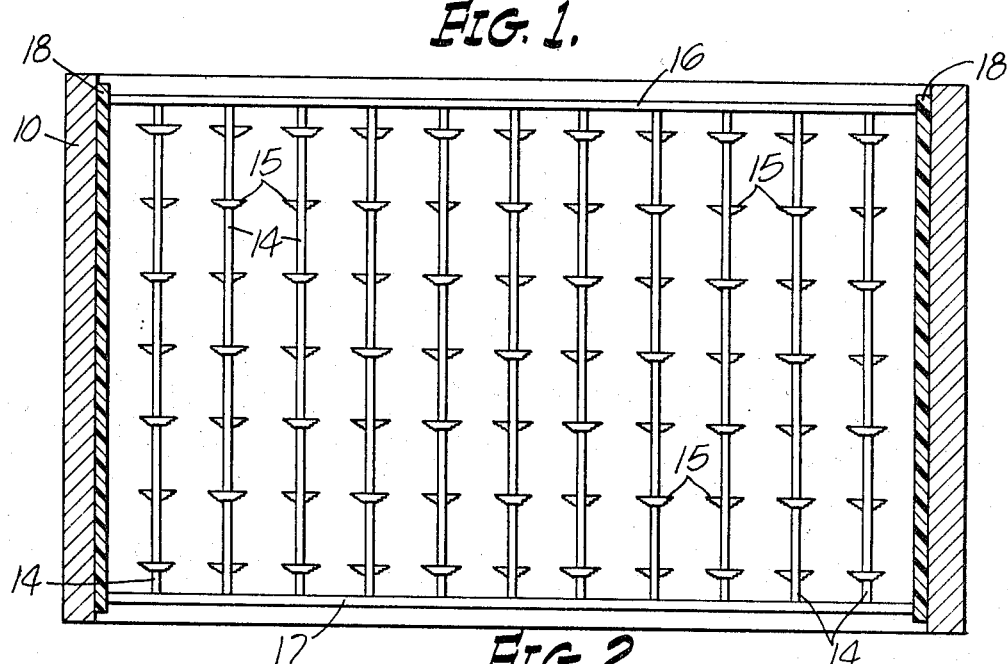
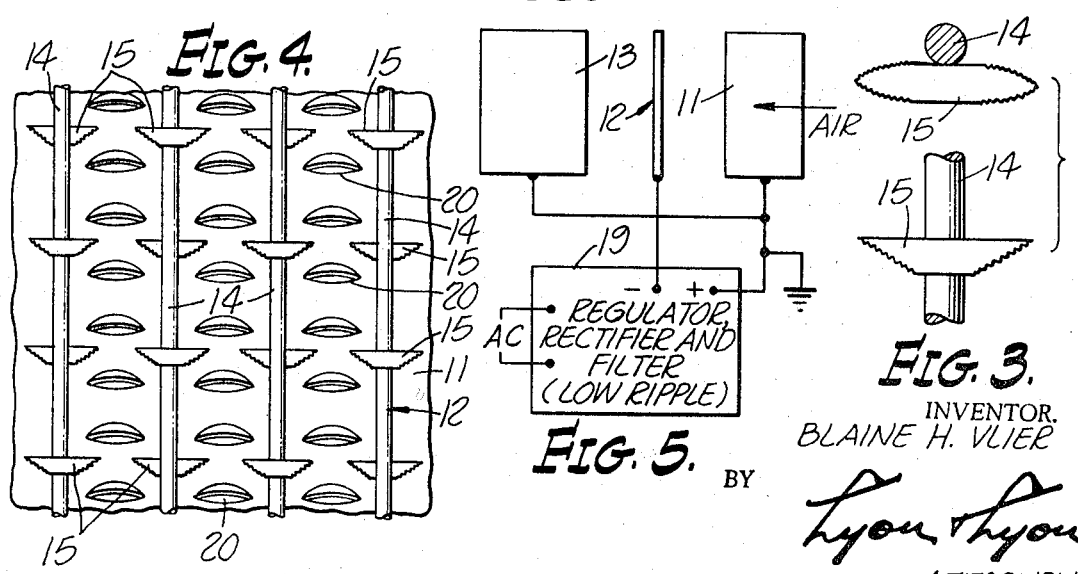

3,555,818
ELECTROSTATIC PRECIPITATOR
Blaine H. Vlier, 1012 E. Wilson Ave.,
Glendale, Calif. 91206
Filed Apr. 22, 1968, Ser. No. 723,166
Int. Cl. B03c 3/00
U.S. Cl. 55—131
3 Claims

ABSTRACT OF THE DISCLOSURE

A precipitator for electrostatically removing dust and other contaminants from air passing through it. The precipitator comprises a pair of mechanical filters positioned on either side of an ionizing grid, an electric field being established between the grid and the mechanical filters. The grid may be in the nature of a plurality of vertical wires or rods to which short horizontal pointed elements are fastened. These pointed elements ionize the air to charge the contaminants passing therethrough, the charge on the contaminants causing them to be attracted to the mechanical filters. The potential between the screen and the filters is D.C. with a low ripple factor.

BACKGROUND OF THE INVENTION

Many different types of precipitators have been provided for removing contaminants from the atmosphere. Typically, such precipitators use a fine wire grid to charge the particles of dust or the like and an oppositely charged collecting plate to collect the charged particles. Such precipitators also usually employ one or more filters for mechanically trapping particles. These filters are generally treated with oil or the like to make the particles adhere to them. The oil treatment results in a build-up of material which is very difficult to remove during the periodic cleanings which are required.

The use of a wire grid presents various difficulties because of the nature of the corona discharge which exists around a fine wire. Corona discharge does not occur uniformly along a fine wire but rather occurs at points of discontinuity along it, points, for example, where the wire has been bent or nicked, or where dirt has collected. As a result, the air is not ionized along the entire length of the wire and it is possible for dust or other contaminant particles to pass through the grid at points where no ionization is occurring with the result that these particles are not charged. Consequently, only the mechanical filter can be relied upon to capture these particles and generally speaking these filters do not have a high enough collection efficiency to be completely satisfactory, particularly in those situations where a very high degree of air cleanliness is desired.

It has also been found that it is more efficient in electrostatic precipitation to charge the grid with a negative potential. However, at the high voltages usually required for such precipitators, the massive breakdown of the air engendered by the use of negative potential on the grid results in excessive generation of oxides of nitrogen which are both unpleasant and unhealthy and defeat the purpose of the precipitator.

SUMMARY OF THE INVENTION

According to the present invention, an electrostatic precipitator is provided which permits the use of a negative potential on the ionizing grid or electrode while greatly reducing if not eliminating the generation of amounts of oxides of nitrogen and which accordingly has a very high efficiency. The construction of the precipitator makes it unnecessary to oil treat the mechanical filters as the filters serve as the electrostatic collector and the electrostatic forces are sufficient to hold the collected particles on the filters. These favorable results are achieved by providing a grid for charging the dust or other contaminant particles, the grid, for example, being in the form of a plurality of vertical rods to which short horizontal pointed elements having ragged points are attached. A corona discharge occurs around each of these points, the fields of the various points overlapping to form an uninterrupted field through which all of the contaminant particles must pass with the result that the chances are very great that they will be charged and electrostatically collected. A grid constructed in this fashion permits the use of a relatively low potential and by using a well regulated potential with a very low ripple factor, excessive ionization of the air with the concomitant generation of oxides of nitrogen can be greatly reduced if not eliminated.

It is therefore an object of the present invention to provide an improved electrostatic precipitator.

It is another object of the present invention to provide an electrostatic precipitator in which a negatively charged, discontinuous grid is used to charge contaminant particles entrained in the air passed therethrough.

It is also an object of the present invention to provide an electrostatic precipitator in which mechanical filters or the like are used as electrostatic collecting surfaces.

BRIEF DESCRIPTION OF THE DRAWINGS

FIG. 1 is a top plan view of the precipitator of the present invention;

FIG. 2 is a cross-sectional view taken along lines 2—2 of FIG. 1;

FIG. 3 is an enlarged detail view of a portion of the grid of the present invention;

FIG. 4 is an enlarged detail view of a portion of the grid and mechanical filter of the present invention; and FIG. 5 is a circuit diagram showing the connections of the precipitator.

DESCRIPTION OF THE INVENTION

Turning now to the drawings, the precipitator has a housing or conduit 10 through which air is drawn by a fan or the like. Mounted within the housing 10 is a first collecting electrode which may, as shown, be a mechanical filter 11, a grid 12, and a second collecting electrode which may also be a mechanical filter 13. The mechanical filters 11 and 13 are constructed of electrically conductive material, for example, of several layers of expanded aluminum sheet having a plurality of holes formed therein through which the air passes. The filter 11 is preferably about one half as thick as the filter 13 and initially receives the air flowing through the housing 10. As shown, the grid 12 is comprised of a plurality of parallel vertical rods 14 to which are welded or otherwise attached a number of short, horizontal pointed elements 15 which protrude from the vertical rods toward the adjacent vertical rods. If desired, the pointed elements 15 can be directed toward the filters 11 and 13 instead of at the adjacent rods.

As shown in FIG. 3, the pointed elements 15 are preferably cut at an angle with a knife or the like so that the metal is in effect torn to leave the edge of the point rough and with a plurality of small points. The vertical rods 14 are mechanically and electrically connected by members 16 and 17 which extend across the entire width of the housing and are mounted to the housing in any desired fashion, for example, by insulators 18.

If desired, the grid 12 could be fabricated by taking a conventional metal screen having a plurality of parallel horizontal wires and a plurality of parallel vertical wires welded or otherwise attached thereto and severing the horizontal wires between the vertical wires to leave pointed members protruding from the vertical wires. The resulting screen could be provided with a frame and mounted in the conduit by suitable insulators. The screen type grid could also be fabricated by severing the vertical wires and leaving the horizontal wires intact. Of course, the rods could also be arranged horizontally with the points directed vertically or at the filters. In any event, the principal function of the grid is to establish a great number of fields which overlap to form a continuous field which will insure that all contaminant particles will be charged. It will be obvious to those skilled in the art that other grids basically similar in structure to those described could be constructed and are included within the scope of this invention.

As shown in FIG. 5, the grid 12 is connected to the negative terminal of a voltage, rectifier and filter 19, the input of which is connected to an AC source, while the filters 11 and 13 are connected to the positive terminal which is grounded. In order to prevent arcing and to maintain the voltage at the desired value, it is necessary that the output of the regulator 19 be relatively constant and have a low ripple factor, preferably less than 4%. If the ripple is appreciably higher than this figure, the voltage swings around the nominal level to become important as to the amount of air that is ionized and the amount of oxides of nitrogen that are produced. If desired, the grid can be positively charged although a negative charge is preferred.

In order for the collection efficiency of the precipitator to be as high as possible, the sheets of aluminum or the like of which the mechanical filters are constructed should be provided with sufficient holes to permit the desired amount of air to pass through without requiring a substantial pressure difference but should also be provided with sufficient surface area between the holes to provide a relatively large, flat collection surface for the charged particles. It has been found preferable to make the area between the holes 20 of the sheet of the filter as great as or greater than the diameter of the rods or wires making up the grid 12, as is shown in FIG. 4. These areas between holes should be as large as possible consistent with the provision of sufficient spaces to permit air to be easily drawn through the precipitator. These holes are preferably formed by moving the metal on each side of a slit so that the surface presented to the grid is almost solid but which nevertheless permits substantial airflow therethrough. It is not necessary that the collecting electrodes be mechanical filters in the conventional sense, that is, they need not perform any substantial mechanical filtering. It is enough that they pass air and provide a sufficiently large collection surface.

In the preferred embodiment of this invention, the filters 11 and 13 are both spaced from the grid 12 by a distance of one-half inch, the filter 11 being one-half inch thick and the filter 13 being one inch thick. The grid is preferably made from sixteen gauge steel wire for durability in which the individual rods and pointed elements are separated, both horizontally and vertically, by a space of one-half inch. The voltage applied should be approximately 8,200 volts. This voltage will vary somewhat because of the normal imperfection of construction and spacing of the filters and grid and its preferred value can be determined by metering both the voltage and current applied to the grid. When the current begins to increase faster than the voltage as the voltage is raised, the desired point has been passed and the voltage should be reduced accordingly.

The operation of the above-described precipitator is as follows:

The initial mechanical filter 11 traps the large particles entrained in the air on its forward surface; of the remaining particles, some are trapped in the interior of the filter, but others manage to pass entirely through the filter and emerge into the ionization chamber between the filters 11 and 13. The larger or heavier particles have generally been slowed down somewhat by a series of collisions with the filter 11 and since they are easily charged, they pick up a negative charge before they penetrate very far into the ionization chamber. Consequently, they are immediately drawn back to the rear surface of the filter 11. The smaller or lighter particles, on the other hand, have not had their progress significantly impeded by the filter 11, and being harder to charge, generally penetrate as far as the grid 12 before picking up a negative charge. They are then driven to the forward or interior side of the second filter 13. The filter 13 is made thicker than the filter 11 because it will collect a larger percentage of the foreign particles than the initial filter 11. The precipitator thus subjects the air to an initial stage of mechanical filtering and essentially two stages of electrostatic filtering although only a single grid is used. It has been found that when the precipitator is cleaned, by far the greatest collection of dirt and the like is found on the rear surface of the filter 11 and the forward surface of the filter 13; that is, the two surfaces of the filter which form the boundaries of the ionization chamber.

The invention may be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An electrostatic precipitator comprising: a conduit for a flow of air; a first collecting electrode positioned across said conduit for intercepting foreign particles in said air; a second collecting electrode positioned across said conduit downstream from said first collecting electrode for intercepting foreign particles in said air; a source of D.C. potential having positive and negative terminals; means electrically connecting said positive terminal to said first and second electrodes and to electrical ground; ionizing means positioned across said conduit intermediate said electrodes and electrically insulated therefrom for negatively charging foreign particles emerging from said first collecting electrode and driving the larger of said particles back to said first collecting electrode and the smaller of said particles to said second collecting electrode; and means electrically connecting said ionizing means with said negative terminal; said ionizing means comprising a metal grid having a plurality of elongated members extending across said conduit, each of said members having a plurality of short pointed elements attached thereto at spaced intervals, each of said pointed elements having at each end a rough edge with a plurality of small points; said elongated members and pointed elements being spaced apart by a distance approximately equal to the spacing of said grid from said collecting electrodes whereby a substantially uniform and uninterrupted electrical field is produced; said collector electrodes presenting a larger surface area than said grid.

2. The precipitator of claim 1 wherein said collecting electrodes each comprises at least one sheet of metal having holes formed therein to permit passage of air therethrough, the area of said sheet between said holes being at least as great as the transverse dimension of said elongated members.

3. The precipitator of claim 1 wherein said D.C. potential comprises a source of A.C. potential and means for regulating, rectifying and filtering said A.C. potential, the D.C. output of said means having a ripple factor less than approximately 4%.

References Cited

UNITED STATES PATENTS

| | | | |
|---|---|---|---|
| 888,638 | 5/1908 | Morscher | 55—150X |
| 2,352,651 | 7/1944 | Meston | 55—151X |
| 2,556,982 | 6/1951 | Roos et al. | 55—131 |
| 2,933,151 | 4/1960 | Kurtz | 55—131 |
| 2,936,851 | 5/1960 | Cook | 55—131 |
| 2,973,054 | 2/1961 | Kurtz | 55—131 |
| 3,434,441 | 3/1969 | Testone | 101—416 |

FOREIGN PATENTS

| | | | |
|---|---|---|---|
| 607,756 | 11/1960 | Canada | 55—131 |
| 687,858 | 6/1964 | Canada | 55—152 |
| 130,722 | 2/1961 | Sweden | 55—152 |

DENNIS E. TALBERT, JR., Assistant Examiner

U.S. Cl. X.R.

55—138, 139, 140, 152, 154